United States Patent
Hao et al.

(10) Patent No.: US 9,387,766 B2
(45) Date of Patent: Jul. 12, 2016

(54) VEHICLE WITH SELECTIVELY ENABLED BOOST CONVERTER

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Thomas Wolfgang Nehl, Shelby Township, MI (US); Suresh Gopalakrishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/483,602

(22) Filed: Sep. 11, 2014

(65) Prior Publication Data

US 2016/0075241 A1    Mar. 17, 2016

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60L 11/18 | (2006.01) |
| H02P 6/08 | (2016.01) |
| B60K 6/26 | (2007.10) |
| B60K 6/48 | (2007.10) |

(52) U.S. Cl.
CPC ............... *B60L 11/1803* (2013.01); *B60K 6/26* (2013.01); *B60K 6/48* (2013.01); *H02P 6/08* (2013.01); *B60K 2006/4825* (2013.01); *Y10S 903/906* (2013.01)

(58) Field of Classification Search
CPC ........ B60L 11/1803; B60K 6/26; B60K 6/48; B60K 2006/4825; H02P 6/08; Y10S 903/906
USPC .................... 701/22; 318/580, 139; 180/65.1
See application file for complete search history.

(56) References Cited

U.S. PATENT DOCUMENTS

| | | | | |
|---|---|---|---|---|
| 5,373,195 A * | 12/1994 | De Doncker | .......... | B60L 11/005 307/45 |
| 5,710,699 A * | 1/1998 | King | ..................... | B60L 11/005 318/139 |
| 8,965,618 B2 * | 2/2015 | Isayeva | .................... | H02H 7/09 180/65.285 |
| 2010/0291445 A1 * | 11/2010 | Igarashi | .................. | B60L 1/003 429/428 |
| 2011/0095603 A1 * | 4/2011 | Lee | ..................... | B60L 11/1803 307/10.1 |
| 2014/0277882 A1 * | 9/2014 | Isayeva | .................... | H02H 7/09 701/22 |
| 2014/0311426 A1 * | 10/2014 | Yamazaki | .............. | B60K 6/445 123/2 |

* cited by examiner

*Primary Examiner* — Jaime Figueroa
(74) *Attorney, Agent, or Firm* — Quinn Law Group, PLLC

(57) ABSTRACT

A vehicle includes a transmission, energy storage system (ESS), power inverter module (PIM), and controller. The PIM includes a boost converter having a bypass switch and a first plurality of switches, and also a power inverter having a second plurality of switches. The controller is programmed to execute a method that enables a DC boost converter of the PIM by opening the bypass switch when a speed and a torque of the electric machine are within a predetermined boost range. The controller bypasses the boost converter by transmitting a second switching signal closing the bypass switch when the speed and torque are not within the predetermined boost range. A voltage input to the power inverter is equal to the DC battery voltage whenever the boost converter is bypassed and exceeds the DC battery voltage whenever the boost converter is enabled.

15 Claims, 2 Drawing Sheets

VEHICLE WITH SELECTIVELY ENABLED BOOST CONVERTER

TECHNICAL FIELD

The present disclosure relates to a vehicle having a selectively enabled boost converter.

BACKGROUND

A hybrid electric or battery electric vehicle transmission typically includes one or more high-voltage polyphase electric machines in the form of a motor generator unit or an electric traction motor. Electric machines deliver/charge power to or draw power from a rechargeable direct current (DC) battery pack. The energized electric machines adjust torques of the various gear sets of the transmission to achieve optimal system efficiency. A DC boost converter is typically used to increase the battery output voltage to a level suitable for use by the electric machines.

Semiconductor switches of a power inverter module are controlled via pulse-width modulation or other switching control signals to convert the boosted battery output voltage from the DC boost converter into an alternating current (AC) output voltage. The AC output voltage from the power inverter module is ultimately transmitted to the individual phase windings of the electric machine. The energized electric machine powers the drivetrain of the vehicle.

SUMMARY

A vehicle is disclosed herein that includes a transmission, a direct current (DC) battery pack, a power inverter module (PIM), and a controller. The transmission includes at least one high-voltage polyphase electric machine. The electric machine is electrically connected to the battery pack via the PIM. The PIM according to the present disclosure includes a DC boost converter and a power inverter. As is well known in the art, a DC boost converter includes various electrical circuit components such as capacitors, inductors, and semiconductor switches, with switching of the semiconductor switches ultimately increasing or boosting the voltage level available from the DC battery pack. The power inverter is operable, via pulse width modulation or other switching techniques, to convert the boosted DC voltage to an alternating current (AC) voltage output, and vice versa. Thus, vehicles equipped with a PIM can readily convert braking energy for storage in the DC battery pack and can convert a DC voltage output from the DC battery pack into AC power suitable for energizing the electric machine(s).

The DC boost converter described herein includes a bypass switch. The DC boost converter may be electrically connected between an input filter capacitor and an input node of the power inverter. The controller, via different switching commands, respectively closes or opens the bypass switch depending on the present operating mode of the vehicle. Closing the bypass switch connects the DC battery pack to the input node of the power inverter, thereby bypassing the DC boost converter. Opening the bypass switch in turn allows the DC boost converter to function in its normal or conventional capacity, i.e., by delivering a boosted DC voltage to the input node of the power inverter well in excess of the battery voltage. Control of the opening and closing of the bypass switch is performed according to the steps of an associated method as explained herein.

Control of the bypass switch in the disclosed manner provides certain advantages. A hybrid or battery electric vehicle electrical system typically includes a DC boost converter that is sized for the peak power consumption of the power inverter, such as 90 kW in a non-limiting example battery electric vehicle design. As a result of such a conventional design, as recognized herein, the components of the DC boost converter have to be sized to 90 kW. However, from a fuel economy point of view it is not necessary to use a 90 kW boost converter. A lower power converter, e.g., 30 kW, could provide as much as 90% of the fuel economy benefit of the 90 kW boost converter since the vehicle needs less power during most of its operating region on a typical drive cycle.

Therefore, optimal sizing of the boost converter from a fuel economy perspective and control of the bypass switch to selectively bypass and enable the boost converter based are central to the present approach. That is, during certain transmission operating modes, in particular high-speed operation of the electric machine, the electric machine mainly operates in a lower torque/lower power region of its motor performance envelope. Improved efficiency and power may therefore be achieved relative to conventional/full-sized boost converter designs and control approaches via the disclosed bypass switch and the resultant downsized DC boost converter. Further, the resultant downsized DC boost converter may reduce the cost, size, and weight of the system.

An example embodiment of a vehicle includes a transmission having a polyphase electric machine. The vehicle also includes a battery pack having a DC battery voltage, a PIM, and a controller. The PIM, which is electrically connected to the battery pack, includes the DC boost converter and power inverter noted above. The DC boost converter includes a bypass switch and a first plurality of switches. The power inverter has a second plurality of switches.

The controller is in communication with the bypass switch and with the first and second plurality of switches. The controller is programmed to enable the DC boost converter by selectively opening the bypass switch via a first switching control signal. This occurs when a speed and a torque of the electric machine fall within a predetermined boost range. The controller is also programmed to bypass the DC boost converter by transmitting a second switching signal closing the bypass switch, which occurs when the speed and torque are not within the predetermined boost range. A voltage input to the power inverter is equal to the DC battery voltage whenever the DC boost converter is bypassed, minus any transmission losses in any conductors of the electrical circuit used to connect the battery pack to the DC boost converter and the power inverter. The voltage input to the power inverter exceeds the DC battery voltage whenever the DC boost converter is enabled.

An electrical system for the vehicle includes the PIM and the controller noted above.

A method is also provided for use in a vehicle having a transmission with a polyphase electric machine, a battery pack having a DC battery voltage, and a PIM that is electrically connected to the battery pack. The method includes determining a speed and a torque of the electric machine and selectively enabling a DC boost converter of the PIM via a controller. Enabling of the DC boost converter occurs by opening a bypass switch via a first switching control signal. This occurs whenever the speed and torque of the electric machine fall within a predetermined boost range, such that a voltage input to the power inverter exceeds the DC battery voltage whenever the boost converter is enabled. The method also includes selectively bypassing the DC boost converter by transmitting a second switching signal closing the bypass switch when the speed and torque are not within the predetermined boost range. The voltage input to the power inverter is effectively equal to the DC battery voltage, less power losses, whenever the DC boost converter is bypassed.

The above features and advantages and other features and advantages of the present disclosure are readily apparent from the following detailed description of the best modes for carrying out the invention when taken in connection with the accompanying drawings.

DETAILED DESCRIPTION

Figure 1:
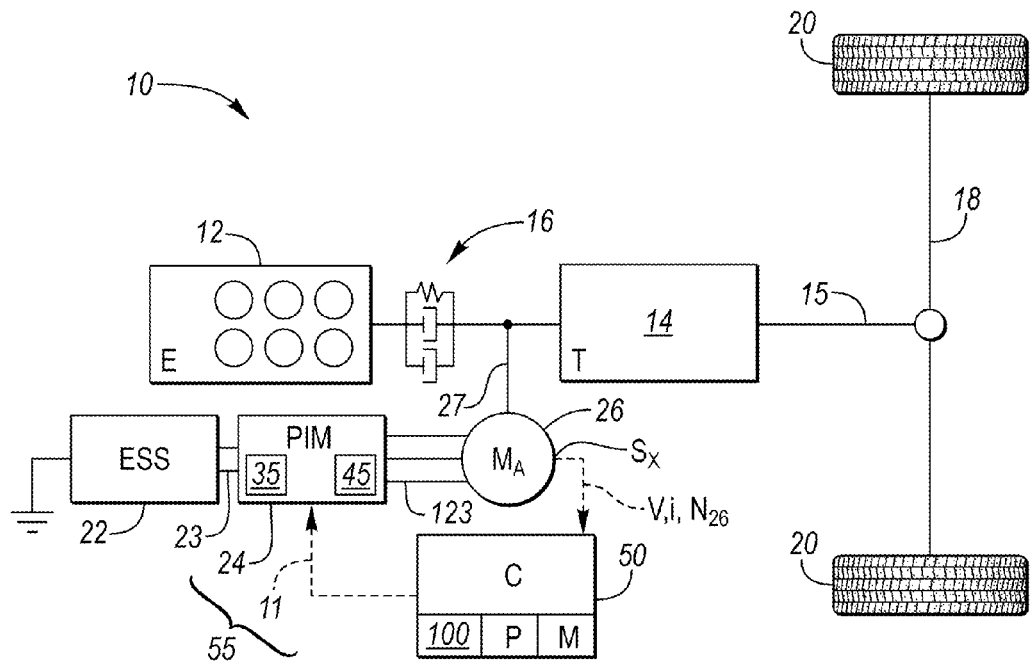
FIG. 1 is a schematic illustration of a vehicle having an electrical system machine with a selectively enabled DC boost converter as set forth herein.

Referring to the drawings, wherein like reference numbers refer to like components throughout the several views, FIG. 1 depicts a schematic example vehicle 10 having a transmission (T) 14. The vehicle 10 includes a high-voltage polyphase electric machine ($M_A$) 26 in the form of an electric traction motor or a motor generator unit, which may be part of the transmission 14 or apart from the transmission 14 depending on the embodiment. The transmission 14 transmits output torque to an output member 15. The output member 15 ultimately delivers the output torque to a set of drive wheels 20 via a drive axle 18.

The vehicle 10 may include an optional internal combustion engine (E) 12 to implement a hybrid electric vehicle powertrain, or the vehicle 10 may forego the engine 12 when configured as a battery electric vehicle. When the engine 12 is used, an optional damper assembly 16 may be used to connect the engine 12 to the transmission 14. As is well known in the art, such a device is used to reduce the noise, vibration, and harshness that may occur when turning the engine 12 on or off.

The electric machine 26 is powered via an electrical system 55 having a high-voltage energy storage system 22 in the form of a direct current (DC) battery pack and associated power electronics. The electrical system 55 also includes a power inverter module (PIM) 24. As described in more detail below with reference to FIG. 2, the PIM 24 includes a DC boost converter 35 and a power inverter 45. The DC boost converter 35 is operable to increase the DC voltage level from the ESS 22 and deliver the boosted DC voltage to the power inverter 45.

The power inverter 45 in turn is operable to convert the boosted DC voltage to an alternating current (AC) waveform suitable for powering the electric machine 26. Semiconductor switching techniques and associated structure are well known in the art, and are used by the controller 50 in controlling the flow of power to and from the ESS 22 and the electric machine 26. Motor torque from the electric machine 26 is transmitted to the transmission 14 via a motor shaft 27 in the illustrated example embodiment. A high-voltage DC bus 23 electrically connects the ESS 22 to the PIM 24, while a polyphase AC bus 123 electrically connects the PIM 24 to the various phase windings of the electric machine 26.

In possible embodiments the electric machine 26 may be variously configured as a wound-field synchronous machine, a wound-field claw pole (Lundell) synchronous machine, a permanent magnet embedded claw pole (Lundell) machine, a permanent magnet synchronous machine, or a synchronous reluctance machine with or without permanent magnets within its rotor. The electric machine 26 may also be configured as an induction machine or switch reluctance machine. While a typical three-phase embodiment is shown in FIGS. 1 and 2, the use of the present control approach is not limited to three-phase electric machines.

A controller (C) 50 is in communication with the electric machine 26 and the PIM 24. The controller 50 includes a processor P and memory M. The memory M includes tangible, non-transitory memory, e.g., read only memory, whether optical, magnetic, flash, or otherwise. The controller 50 also includes sufficient amounts of random access memory, electrically-erasable programmable read only memory, and the like, as well as a high-speed clock, analog-to-digital and digital-to-analog circuitry, and input/output circuitry and devices, as well as appropriate signal conditioning and buffer circuitry.

A plurality of sensors $S_X$ positioned with respect to the electric machine 26 are operable to measure and transmit electrical parameters to the controller 50, e.g., a motor control voltage, a motor control current, and a rotational speed (V, i, and $N_{26}$, respectively). Sensors $S_X$ may measure changing position with the controller 50 calculating the speed ($N_{26}$) in another embodiment. The sensors $S_X$ may be embodied as resolvers, encoders, or Hall-effect sensors that measure or ultimately determine the rotational speed ($N_{26}$) of a rotor of the electric machine 26, e.g., of the motor shaft 27. The voltage and current (V and i) are respectively measured via suitably configured voltage and current sensors. The controller 50 selectively outputs a switching control signal (arrow 11), in one of two states, during certain operating modes to selectively enable or bypass a DC boost converter 35 of the PIM 24. This particular function and structure will now be described with reference to FIGS. 2-4. The same controller 50 or another device may also control the normal voltage boosting and power conversion functions typical of any power inverter module.

Figure 2:
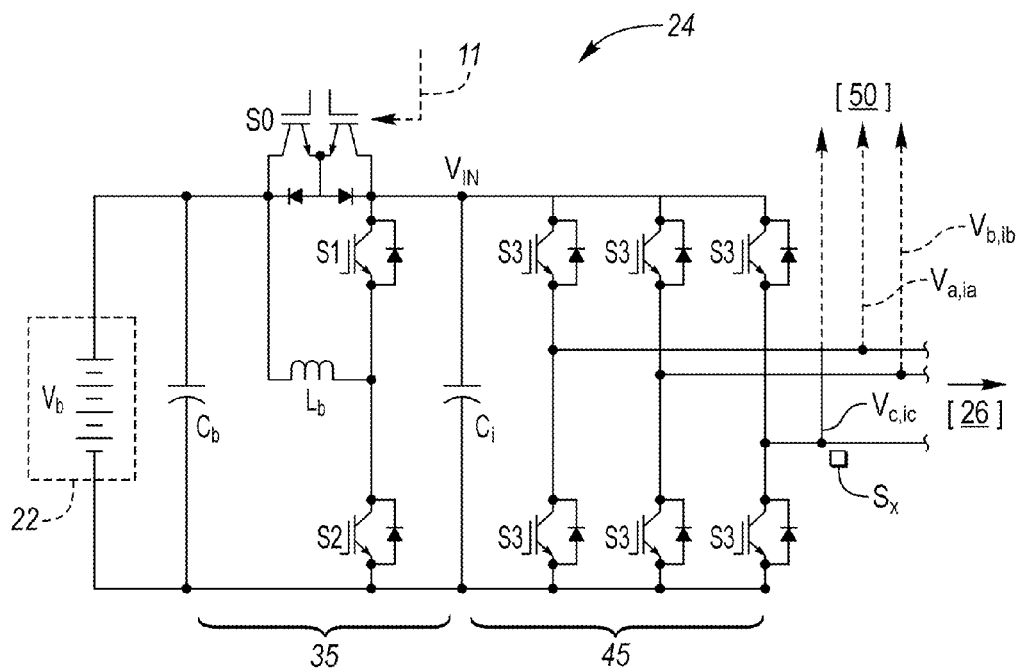
FIG. 2 is a schematic circuit diagram of an example of the electrical system shown in FIG. 1.

The PIM 24 is shown schematically in FIG. 2. The battery pack of the ESS 22 has a DC battery voltage $V_b$, which in a typical high-voltage application may be in the range of 150-250 VDC. An input filter capacitor $C_b$ of the DC boost converter 35 is connected in parallel across the ESS 22 as shown, with a boost inductor $L_b$ being electrically connected between the boost switches S1 and S2. The boost switches S1 and S2 thus form a first plurality of switches to be controlled via the controller 50 of FIG. 1 in normal boost operations of the DC boost converter 35. By using the DC boost converter 35, the power inverter 45 may be provided with voltages of up to 4 times that of the battery voltage $V_b$.

The power inverter 45 of the PIM 24, as is well known in the art, includes a second plurality of semiconductor switches S3 that are controlled via pulse-width modulation signals to convert the inverter input voltage $V_{IN}$ to a polyphase output voltage. The polyphase output voltage is ultimately transmitted to the phase windings of the electric machine 26. Control of the DC boost converter 35 and the power inverter 45 is maintained via input to the controller 50 of FIG. 1 in the form of measured speed/position, as well as voltage and current for each phase winding of the electric machine 26, the latter of which are shown as $V_a, i_a, V_b, i_b,$ and $V_c, i_c$ as measured by the sensors $S_X$.

With respect to the DC boost converter 35 of FIG. 2, as part of the present design a bypass switch S0 is positioned between the input filter capacitor $C_b$ and an input node of the power inverter 45, such that an inverter input voltage $V_{IN}$ is delivered to the power inverter 45. The bypass switch S0 receives the switching control signal (arrow 11) from the controller 50, with the on/off state of the switching control signal (arrow 11) depending on the present operating mode of the vehicle 10 of FIG. 1.

When the bypass switch S0 is activated, for instance via receipt of a binary switching signal of 1 or other suitable switching signal from the controller 50, the bypass switch S0 closes. A closed bypass switch S0 effectively bypasses the boost switches S1 and S2 and the boost inductor $L_b$. When this occurs, the inverter input voltage $V_{IN}$ is equal to the battery voltage $V_b$ minus negligible electrical power transmission/conduction losses. When the bypass switch S0 is deactivated, again via suitable switching control signals (arrow 11) from the controller 50, e.g., a binary 0, the bypass switch S0 opens. An open bypass switch S0 restores full boost functionality to the boost converter 35 by reconnecting the boost inductor $L_b$ and the boost switches S1 and S2 to the power inverter 45. Thus, the controller 50 can transmit the switching control signals (arrow 11) with different states to selectively open or close the bypass switch S0. The specific approach to timing of the control of the bypass switch S0 is described in more detail below with reference to FIGS. 3 and 4.

The bypass switch S0 as shown schematically in FIG. 2 may be variously embodied as one or more electromechanical relays or semiconductor switches. Electromechanical relays may be used when the response time is not a critical design feature. A design using such relays has a cost advantage relative to alternative designs. Alternatively, the bypass switch S0 may be an efficient bi-directional blocking solid-state switch constructed of insulated gate bipolar transistors (IGBTs) or as reverse-blocking IGBTs, or as GaN or SiC-type metal-oxide field effect transistors (MOSFETs), all of which are well known in the art.

As will now be explained with reference to FIGS. 3 and 4, the bypass switch S0 of FIG. 2 is closed via the controller 50 to bypass the DC boost converter 35 only in certain high-power modes of the electric machine 26. Selective bypassing of the DC boost converter 35 is intended to eliminate losses in the boost inductor $L_b$ and to allow the boost converter 35 to be downsized relative to designs lacking the bypass switch S0 and control via the method 100.

Figure 3:
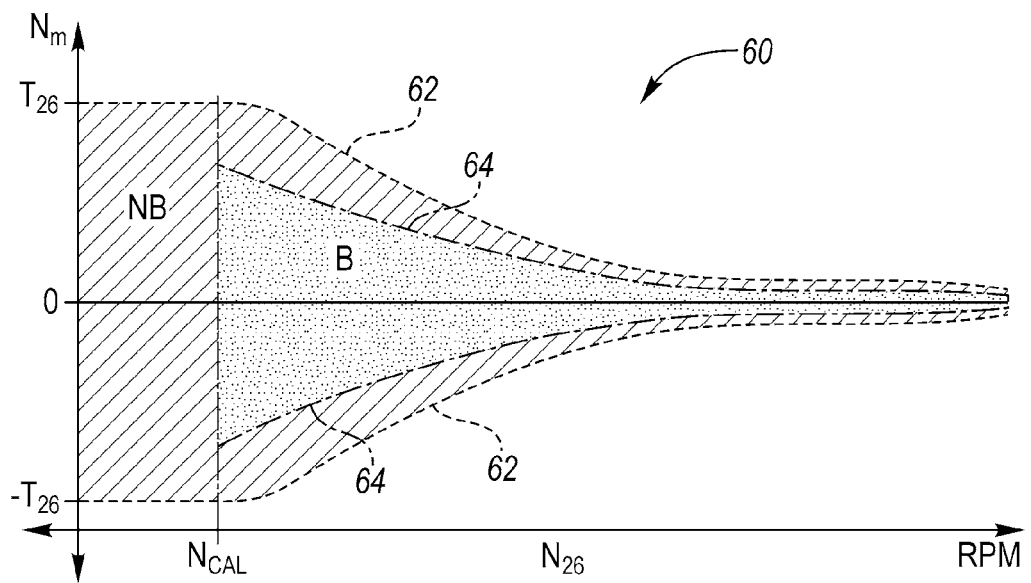
FIG. 3 is a schematic illustration of a motor performance envelope describing the speed and torque of the electric machine shown in FIG. 1, with speed plotted on the horizontal axis and machine torque plotted on the vertical axis.

A calibrated motor performance envelope 60 is shown in FIG. 3 that describes the two modes of the DC boost converter 35 of the PIM 24 shown in FIG. 2 with respect to the measured or calculated motor speed $N_{26}$ and motor torque $T_{26}$. Motor speed ($N_{26}$) and motor torque ($T_{26}$) are shown in RPM and Nm, respectively, in FIG. 3. The power of the electric machine 26 of FIG. 1 is the product of the motor torque $T_{26}$ and speed $N_{26}$, and therefore the phrase "high-power" for the purposes of control according to the method 100 refers to any operating mode in which this product exceeds a calibrated power threshold.

Two modes of the DC boost converter 35 include "non-boost" (NB) and "boost" (B). The non-boost mode or "bypass mode" is entered whenever the bypass switch S0 of FIG. 2 is closed. Likewise, the boost mode is entered whenever the bypass switch S0 of FIG. 2 is opened. The controller 50 may be programmed with a calibrated speed ($N_{CAL}$) below which the bypass switch S0 is closed. Above this calibrated speed ($N_{CAL}$), the controller 50 selectively bypasses the DC boost converter 35 of FIG. 2 by closing the bypass switch S0. The timing of the closing or opening of the bypass switch S0 always depends on the present value of the motor torque $T_{26}$ and motor speed $N_{26}$.

Because the method 100 reduces the amount of time and operating power level over which the boost converter 35 is used in a given drive cycle, the DC boost converter 35 may be effectively downsized relative to conventional designs as noted above. To implement the calibrated motor performance envelope 60 of FIG. 3, the controller 50 of FIG. 1 may be programmed with a calibrated map defined by the power and speed of the electric machine 26. In other words, the motor torques ($T_{26}$, $-T_{26}$) and speeds ($N_{26}$) corresponding to the particular boundaries 62 and 64 shown in FIG. 3 may vary with the design of the vehicle 10 of FIG. 1. FIG. 3 shows just one possible example drive cycle.

Figure 4:
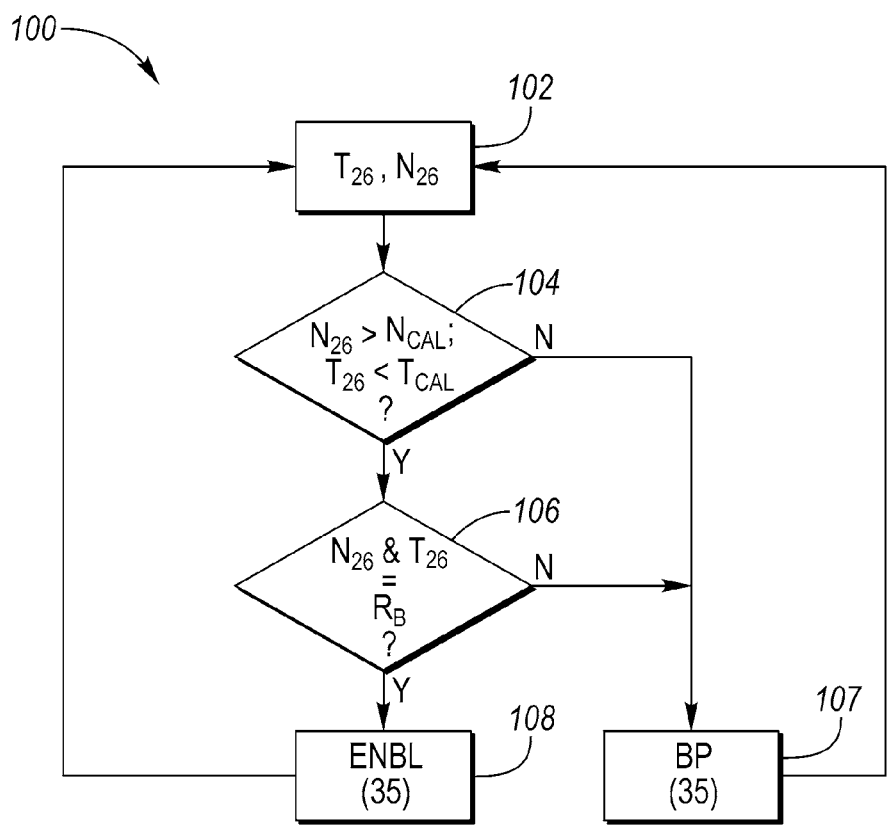
FIG. 4 is a flow chart of an example method for controlling the electrical system shown in FIG. 2.

Referring to FIG. 4, an example embodiment of the method 100 is shown for implementing the control approach described above. At step 102, the controller 50 of FIG. 1 determines the speed ($N_{26}$) and torque ($T_{26}$) of the electric machine 26. The speed ($N_{26}$) may be measured via the sensors $S_X$ of FIGS. 1 and 2 along with voltage and current (V, i). For instance, the voltage and current may be measured at each phase winding of the electric machine 26, as represented in FIG. 2 for an example three-phase system. Torque ($T_{26}$) is calculated or estimated as a function of the voltage, current, and speed of the electric traction motor 26, as is well known in the art, and/or recorded in a lookup table in memory M of the controller 50. Torque ($T_{26}$) can also be measured via a torque sensor (not shown) in other embodiments. The method 100 then proceeds to step 104.

At step 104 the controller 50 next determines whether the present speed ($N_{26}$) of the electric machine 26 exceeds the calibrated speed ($N_{CAL}$) shown in FIG. 3. Step 104 also includes determining if the torque ($T_{26}$) of the electric machine 26, or rather its absolute value as negative torques may occur, is less than a calibrated torque threshold ($T_{CAL}$). Alternatively, step 104 may look to the power of the electric machine 26 in lieu of the torque ($T_{26}$), with the power ($P_{26}$) being calculated as the function of torque and speed, i.e., $P_{26}=(T_{26})(N_{26})$. The method 100 proceeds to step 106 if the speed ($N_{26}$) exceeds the calibrated speed ($N_{CAL}$) and the torque ($T_{26}$) of the electric machine 26 is less than a calibrated torque threshold ($T_{CAL}$). Otherwise, the method 100 proceeds to step 107.

Step 106 entails determining whether the speed ($N_{26}$) and torque ($T_{26}$) fall within a predefined boost range ($R_B$). The predefined boost range ($R_B$) corresponds to the shaded area B in the example embodiment of FIG. 3. The shaded area B is entered in FIG. 3 above the calibrated speed ($N_{CAL}$), but only for torques ($T_{26}$) falling within the limits defined by the boundaries 64. The boundaries 64 demarcate the calibrated torque threshold ($T_{CAL}$) described above with respect to step 104. The method 100 proceeds to step 107 when operating in the shaded region B/predefined boost range $R_B$. The method 100 proceeds in the alternative to step 108 when the electric machine 26 is operating outside of the shaded region B/predefined boost range $R_B$.

At step 107, the controller 50 deactivates the DC boost converter 35 of FIG. 2 via control of the bypass switch S0. This action closes the bypass switch S0 via the switching signal (arrow 11) and thereby bypasses the DC boost converter 35 of FIG. 2. Closing the bypass switch S0 effectively sets the inverter input voltage $V_{IN}$ equal to the voltage of the ESS 22, i.e., the battery voltage $V_b$. The method 100 then repeats step 102.

At step 108, the controller 50 activates the DC boost converter 35 of FIG. 2 via the bypass switch S0. Step 108 may include transmitting the switching signal (arrow 11) in a form that opens the bypass switch S0. Performing step 108 effectively sets the inverter input voltage $V_{IN}$ equal to a multiple of the voltage of the ESS 22, i.e., $V_{IN}=nV_b$ where n is greater than 1. In some embodiments, the multiplier (n) may be between 2-4 times the level of $V_b$ or more. The method 100 then repeats step 102.

The method 100 as set forth above ensures that the DC boost converter 35 of FIG. 2 is bypassed at low speeds or in high-power regions of operation of the electric machine 26. Likewise, the DC boost converter 35 is enabled at higher speeds and low-power modes of operation to improve overall drive efficiency. In boost mode, the inverter input $V_{IN}$ may be set to a predefined value suitable for capturing a desirable amount of fuel economy benefit with a downsized DC boost converter 35. For instance, in a 90 kW peak power example of the electric machine 26, little additional improvement in EV range is gained at levels over 30 kW. Therefore, one way to set the predefined value at $V_{IN}$ during boost mode is to determine the relative improvement in EV range at different levels of boost power.

As will be appreciated by those of ordinary skill in the art, for the above-described design a core idea is the ability to downsize the boost converter 35 based on the operation of the vehicle 10 of FIG. 1. Normally, boost converters are sized to the peak power of the drive system. The present design recognizes that in a typical electric or hybrid electric vehicle, such a vehicle usually requires low power or operates in a low-power region, e.g., in shaded region B in FIG. 3. From a fuel economy point of view, therefore, a method may include identifying the low-power region discussed above for a given powertrain and then sizing the boost converter 35 for this region instead of for peak power in the conventional manner. For a typical example vehicle with 90 kW peak power, a 30 kW boost converter 35 is sufficient for gaining all fuel economy benefit. Sizing the boost converter 35 larger than 30 kW provides negligible fuel economy gain in spite of the higher power capability. The PIM 24 of FIG. 2 is therefore just one way this concept can be used in a vehicle.

While the best modes for carrying out the invention have been described in detail, those familiar with the art to which this invention relates will recognize various alternate designs and embodiments for practicing the invention within the scope of the appended claims.

The invention claimed is:

1. A vehicle comprising:
a transmission having a polyphase electric machine;
an energy storage system (ESS) having a direct current (DC) battery pack with a DC battery voltage;
a plurality of sensors operable to measure a voltage and a current at each phase winding of the polyphase electric machine, and a speed or position of a rotor of the electric machine;
a power inverter module (PIM) that is electrically connected to the ESS and includes:
a DC boost converter having a bypass switch and a first plurality of switches; and
a power inverter having a second plurality of switches; and
a controller in communication with the sensors, the bypass switch, and with the first and second plurality of switches, wherein the controller is programmed to calculate a torque of the electric machine using the measured voltage, current, and speed, and to enable the DC boost converter by opening the bypass switch via a first switching control signal when the speed and the calculated torque of the electric machine are within a predetermined boost range, and to bypass the DC boost converter by transmitting a second switching signal closing the bypass switch when the speed and the calculated torque are not within the predetermined boost range, such that a voltage input to the power inverter is equal to the DC battery voltage whenever the DC boost converter is bypassed and exceeds the DC battery voltage whenever the DC boost converter is enabled.

2. The vehicle of claim 1, further comprising an internal combustion engine that is connected to the transmission.

3. The vehicle of claim 1, wherein the DC boost converter includes an input filter capacitor and the power inverter includes an inverter capacitor, wherein the bypass switch is electrically connected between the input filter capacitor and the inverter capacitor.

4. The vehicle of claim 1, wherein the bypass switch includes an electromechanical relay.

5. The vehicle of claim 1, wherein the bypass switch includes a bi-directional blocking solid-state switch.

6. An electrical system for a vehicle having a transmission with a polyphase electric machine, the electrical system comprising:
a power inverter module (PIM) that is electrically connected to an energy storage system (ESS) and includes:
a DC boost converter having a bypass switch and a first plurality of switches; and
a power inverter having a second plurality of switches;
a plurality of sensors operable to measure a voltage and a current at each phase winding of the polyphase electric machine, and a speed or position of a rotor of the electric machine;
a controller in communication with the sensors and the bypass switch, and with the first and second plurality of switches, wherein the controller is programmed to determine the speed and the torque of the electric machine using the measured voltage, current, and speed, and to enable the DC boost converter by opening the bypass switch via a first switching control signal whenever the speed and torque of the electric machine are within a predetermined boost range, and to bypass the DC boost converter by transmitting a second switching signal closing the bypass switch when the speed and torque are not within the predetermined boost range, such that a voltage input to the power inverter is equal to a DC battery voltage of the ESS whenever the DC boost converter is bypassed and exceeds the DC battery voltage of the ESS whenever the DC boost converter is enabled.

7. The electrical system of claim 6, wherein the DC boost converter includes an input filter capacitor and the power inverter includes an inverter capacitor, and wherein the bypass switch is electrically connected between the input filter capacitor and the inverter capacitor.

8. The electrical system of claim 6, wherein the bypass switch includes an electromechanical relay.

9. The electrical system of claim 6, wherein the bypass switch includes a bi-directional blocking solid-state switch.

10. A method for use in a vehicle having a transmission with a polyphase electric machine, an energy storage system (ESS) having a direct current (DC) battery pack with a DC battery voltage, and a power inverter module (PIM) that is electrically connected to the ESS, the method comprising:
determining a speed and a torque of the electric machine, including measuring, via a plurality of sensors, a speed or position of a rotor of the electric machine and a voltage and current at each phase winding of the electric machine, and calculating, via a controller, the torque as a function of the measured speed, voltage, and current;

enabling a DC boost converter of the PIM via the controller by opening a bypass switch of the DC boost converter via a first switching control signal when the speed and torque of the electric machine are within a predetermined boost range, such that a voltage input to the power inverter exceeds the DC battery voltage whenever the DC boost converter is enabled; and selectively bypassing the DC boost converter by transmitting a second switching signal closing the bypass switch via the controller when the speed and torque are not within the predetermined boost range, such that the voltage input to the power inverter is equal to the DC battery voltage whenever the DC boost converter is bypassed.

11. The method of claim 10, wherein the bypass switch is an electromechanical relay, and wherein selectively bypassing the DC boost converter includes closing the electromechanical relay.

12. The method of claim 10, wherein the bypass switch is a bi-directional blocking solid-state switch, and wherein selectively bypassing the DC boost converter includes closing the bi-directional blocking solid-state switch.

13. The method of claim 10, further comprising determining a low-power region of operation of the electric machine and sizing the DC boost converter for the low-power region and not for peak power of the electric machine.

14. The vehicle of claim 1, wherein the DC boost converter is sized for a low-power region of operation of the electric machine and not for peak power of the electric machine.

15. The electrical system of claim 6, wherein the DC boost converter is sized for a low-power region of operation of the electric machine and not for peak power of the electric machine.

\* \* \* \* \*